Nov. 6, 1962 W. L. VOLLINK 3,062,657
PROCESS FOR MAKING BREAKFAST CEREAL FLAKES
Filed Dec. 3, 1958
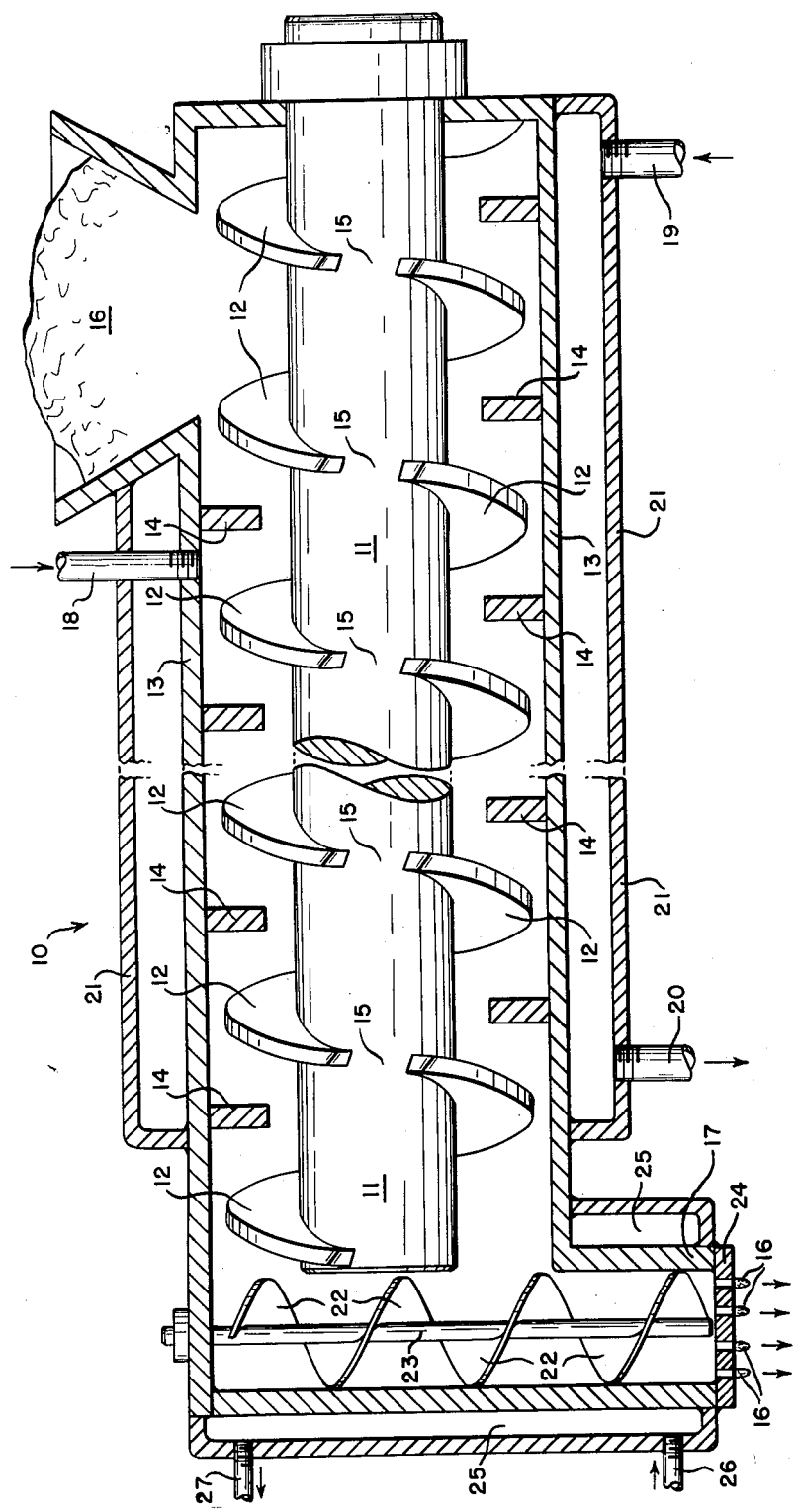

3,062,657
PROCESS FOR MAKING BREAKFAST CEREAL FLAKES

Willard L. Vollink, Battle Creek, Mich., assignor to General Foods Corporation, White Plains, N.Y., a corporation of Delaware
Filed Dec. 3, 1958, Ser. No. 777,826
6 Claims. (Cl. 99—80)

This invention relates to a new and improved process for making a ready-to-eat breakfast cereal product typified by corn and bran flakes.

The present commercial process for making breakfast cereals in flake form calls for a number of processing steps which introduce considerable capital investment and operating expense. Generally speaking, the material of cereal grains either in grit or dough form is cooked at a moisture level ranging from 30–50% for 10–60 minutes in the presence of various flavoring materials such as sugar, salt, malt, etc. Cooking is customarily carried out by steaming the ingredients in a pressure cooker where the materials can be gelatinized under pressures ranging from 15–30 p.s.i.g. In most instances the cooking operation is of the batch type although continuous cookers have been suggested. In any event, the cooking operation can be characterized as cumbersome, time consuming and expensive. The cooked material at the aforesaid moisture level of 30–50% must then be dried down to about 20% moisture and tempered for an additional extended period, say at least one hour and ranging up from 4 to 8 hours for larger particles such as corn grits. This moisture reduction and tempering is for the purpose of permitting the mass of grains or dough pieces to be flaked. Unless such drying is practiced the grain or dough piece will adhere to the flaking roll or its doctor knife making it impossible to get a clean distinct flake for later toasting.

It would be desirable to provide a process whereby many of the foregoing steps are eliminated. Thus, it would be desirable to have a process wherein cereal grains or dough mixtures can be rapidly cooked at low moisture levels such that the necessity for subsequent drying prior to flaking is eliminated. Unfortunately, with the prior art procedures mentioned hereinabove it is not possible to cook the material at such low moistures, say in the order of 20–25% and still get the same gelatinous properties which are obtained at the higher moisture ranges; instead, undue dextrinization and off-flavor development results. To be sure, mechanical extruders employing a rotor with flights and a stator to develop high pressures and temperatures in the treatment of cereal doughs and grains have been suggested; but such extruders as used in the art produce puffed porous extrudates which are not adaptable to being further processed into a crisp ready-to-eat breakfast cereal flake such as corn flakes, bran flakes, rice flakes, wheat flakes and the like, which also have a water resistant blistered toasted character.

Moreover, in the more conventional cooking procedures of the prior art high temperatures under prolonged cooking result in a loss of the nutritional values of the grain or dough components. Thus, for example, in cooking a mixture of cracked wheat and bran (the conventional ingredients of bran flakes) for 55 minutes at 15 p.s.i.g. substantially all of any added thiamine as well as that naturally present is destroyed. Accordingly, it would be desirable to provide a process whereby such nutritive properties can be retained while cooking the ingredients employed in making various ready-to-eat breakfast cereals of good eating quality.

A process has now been developed which satisfies the foregoing needs in a thoroughly practicable manner such that an undue amount of processing time and expense is avoided while at the same time providing a desirably crisp and water resistant, blistered, toasted ready-to-eat flake. This process involves compounding a moist granular mixture of uncooked farinaceous ingredients, typically grain flours like corn flour, whole wheat flour, oat flour, rice flour and like materials of high starch content. The moist granular mixture of the farinaceous starch-containing material has a moisture level less than 30% by weight, a level which is low relative to the moisture level customarily employed in cooking for manufacture of breakfast cereals and broadly ranges between 15 and 30% by weight; preferably, the moisture level is in the order of 20–25% in order that the eventually cooked material will have the proper handling characteristics for subsequent flaking. This moist granular mixture is introduced into the chamber between a rotor and a stator, the rotor or the stator or both being heated by steam or other means and the rotor being provided in the form of a screw with flights which progressively build up pressure and temperature as the mixture is advanced within the chamber. Generally, the cooking operation is carried out in such a manner that gelatinization of the starch results from a combination of heat from the rotor and/or the stator as well as the heat generated by mechanical friction between the particles of the farinaceous materials and the surfaces of the material-contacting elements of the rotor and stator, whereby a progressive build-up of pressure and temperature during this cooking operation occurs due to the proximate spacing of said material-contacting elements. A majority of the energy which is employed to cook the farinaceous cereal material should be supplied by the friction developing between the moving mechanical elements of the extruder and the farinaceous cereal material whereby the starch granules are mechanically ruptured instead of being cooked by swelling at higher moistures, as is the case in the more conventional cooking procedures. However, some swelling and rupture of the starch granules takes place in the course of gelatinization and so the cooking operation is characterized by a combination of these processes.

As the farinaceous cereal material is advanced between the rotor and the stator, the moisture is elevated to a temperature above that at which it will vaporize at ordinary atmospheric pressure, i.e. 212° F., such that upon substantial cooking of the farinaceous cereal material it would ordinarily issue from the extruding nozzle at the terminal of the chamber in a condition where the moisture would flash into vapor and in so doing suddenly expand the material being extruded and cause the same to assume a porous, cellular, spongy structure. However, in the present process the material in this condition issues instead directly into a tempering zone wherein the material maintained under pressure and cooled to a temperature below that at which the moisture present in the cooked dough produced will not contribute to a sudden substantial expansion of the material and vaporization of water when the dough is unconfined at normal atmospheric pressure. Tempering can be carried out in a number of devices in all of which the material is confined and cooled either by the overt addition of a cooling fluid around the tempering zone or by allowing the material to cool as it travels within a suitably elongated chamber. The tempering zone can be more compact and efficient if a cooling medium can be circulated around the tempering chamber and, therefore, it is the preferred practice to employ a cooling screw or auger as a rotor within a water-jacketed stator whereby the temperature of the cooked dough is rapidly reduced to a temperature below 212° F. at ordinary atmospheric pressure. Preferably when the cooked farinaceous material has traversed through the tempering zone it is cooled to a temperature of say 160°–200° F. so that it can be readily extruded through a suitable orifice which may be round, square, polygonal, rectangular or of any other desired shape and can be readily cut into distinct pellets by such means as a rotating knife at the orifice.

The pellets or extrudates thus produced have a density approaching that of the native raw material and, in any event, are of a density greater than that of water, as distinguished from extrudates of the prior art which have a low density whereat they will float on water. The extrudates of the present process have a minimum of voids therein and, hence, are also distinct from the cellular, spongy extrudates of prior art extrusion practices. The extrudates have a moisture content ideal for flaking and generally are in the order of 18–24% by weight, the moisture being uniformly distributed throughout whereby the necessity for tempering is entirely eliminated and the extrudate can be immediately transferred to a flaking operation. The extrudates have physical properties closely approaching those of cooked whole cereal grains after they have been cooked and dried to a comparable moisture. Indeed, the extrudates and particularly pellets formed therefrom can be described as simulating such cooked and dried grains as corn grits, whole wheat berries, oat groats, rice and the like. At the same time, the ingredients of such extrudates are converted to a thoroughly edible digestible and assimilable condition. In connection with the dimension of the extrudate, it is preferably cut into small lengths whereby the pellets produced can be flaked into the more conventional ready-to-eat breakfast cereal flakes. However, the invention is not to be so restricted since longer lengths of the extrudates may also be flaked and when toasted provide the ideal eating qualities which will be described in connection with the description of the flaking operation.

The extrudate of the present process is generally in a condition where it can be introduced without further treatment into a flaking device. However, it is preferred that the extrudate be further cooled prior to entering the flaking device in order for it to have optimal flaking properties. In many instances, this will normally occur as the extrudate is transferred from the cut-off dye to the flaking apparatus. The flaking device can be any one of a variety of conventional designs all of which typically comprise a pair of oppositely rotating rolls through the pinch of which the extrudates or pellets pass. However, instead of a pair of oppositely rotating rolls a single roll may also be employed during which operation the roll travels over a supporting table or plate. The flaking rolls can be heated or cooled to suit particular properties of the material being handled. Normally, the rolls are cooled to dissipate the frictional heat generated by the rolls moving with respect to one another and the material issuing therethrough. The extrudates or pellets are flaked to a thickness corresponding to that usually employed in making ready-to-eat breakfast cereal flakes from a cooked and dried cereal grain. Typically, the setting between a pair of rolls would be such as to give a flake thickness in the order of 0.010–0.050 inch and preferably in the order of 0.025 inch. In any event, the thickness of the flake should be such as to provide the desired toasting characteristics, viz., the flake upon toasting will become crisp and will to some extent blister.

The flake thus produced is then introduced into the conventional toasting operation which is carried out at temperatures in the range of 250°–500° F. in a rotating reel or on a traveling belt. It is possible to get a milder more bland and less heat-treated-tasting cereal flake than is ordinarily achieved by treating corn grits and like grains in the conventional manner. For example, in following the present process the flake derived from a corn flour more closely approaches the flavor of corn bread than is true of the conventional toasted corn flakes of the prior art. On the other hand, other flavoring materials can be employed with the farinaceous cereal mixture introduced to the cooking operation described hereinabove and hereinafter to modify the flavor to suit popular taste. In general, the toasted flake is characterized by its ability to maintain a relatively dense, unexpanded but blistered, crisp, crunchy and non-slumping condition when contacted with aqueous liquids like milk or cream. By virtue of the absence of a substantially spongy, cellular condition in the flake introduced into a toaster the plastic, tenacious, glutenous character of the dough is fully utilized in providing the blistering, crisp character which would not be achieved if an expanded cellular or sponge like mass were flattened or flaked and then toasted.

The advantages of the foregoing process are more fully realized when carrying out the cooking operation in cooking chamber providing maximal heat transfer efficiency since the cooking operation can be drastically shortened and thereby result in greater savings through production speed, less floor space and man-power and less items of equipment. In carrying out the present process cooking devices have been employed which reduce the normally required cooking period by as much as 95%, the required cooking period being dependent to some extent upon the type of farinaceous cereal mixture being processed as well as the temperatures at which such mixtures are ideally cooked. In many operations it is possible to carry out this cooking step at low temperatures, say below those experienced when steam is employed to heat the stator and/or rotor below 300° F. In many ready-to-eat breakfast cereal formulations such as in the case of bran flakes, it is required to employ a high level of sugar, say in the order of 20%, which can be easily scorched or burned through overheating at low moistures. By employing an efficient mechanical extrusion cooker, this problem is entirely eliminated since high temperatures above 300° F. need not be practiced. However, it is not intended to limit the present invention to the use of such temperatures and, generally, cooking at temperatures ranging from 250° F. to as high as 600° F. may be employed, although it is preferred to maintain the temperature of the material traveling between the rotor and the stator at a temperature below 300° F. in order that cooking will stem more from the heat generated by the friction between the relatively moving parts of the rotor and the stator and the farinaceous cereal mixture.

Preferably cooking is carried out in a kneading extruder wherein the rotor or screw has interrupted threads or flights located within a complementary cylindrical jacket or barrel. The jacket preferably has a plurality of rows of spaced teeth projecting inwardly therefrom. The screw is both rotated and reciprocated within the jacket or barrel in order that the stationary teeth of the barrel pass through the interruptions in the thread of the screw as a result of which some of the farinaceous cereal mixture is held back by each of the fixed teeth temporarily as the kneaded mixture is cooked and passes in the direction of the terminal of the chamber. In this way the material is conveyed through the mechanical extruder in loops and is highly mixed while having a maximum opportunity to generate friction in movement against the mechanical elements of the extruder as well as absorb the heat therefrom which heat may be supplied by surrounding or jacketing the barrel with steam. In addition, to achieve cooking steam can be introduced concurrent with the introduction of the moist farinaceous cereal mixture to the chamber to effect more efficient heating. However, it is preferred not to use steam and instead to rely mainly upon the high heat developed through friction and compression as the material travels between the kneading fixed teeth and the interrupted screws or flights of the rotor. In this way it is possible to achieve a high degree of mixing with a relatively short retention time and a corresponding high production rate.

One embodiment of an apparatus in which the process of the instant invention may be conducted is set forth in the attached drawing. That drawing discloses a kneading extruder generally designated 10 which may include there-within a rotor or screw 11. The rotor or screw 11 may be driven by a motor and gear linkage (not shown) which gives the screw 11 a rotary motion and simultaneously a reciprocating motion in a direction parallel to the axis of the screw 11. Interrupted threads or flights 12 are positioned in screw-like form along the periphery of the rotor 11. The inner portion of the shell 13 bears a plurality of teeth 14 spaced therearound, these teeth being adapted to pass through the interruptions 15 in the screw as the screw is simultaneously rotated and reciprocated. The shell 13 may be surrounded by a cooling jacket 21 to which water may be admitted through conduit 19 and from which water may leave through conduit 20. The shell 13 is also provided with conduit 18 through which fluid may be admitted to the interior of shell 13. Shell 13 is also provided with a material inlet hopper 16 at the inlet end thereof. Screw 11 terminates (at the outlet end of the shell 13) at a point spaced from shell 13. Mounted with its axis perpendicular to the axis of screw 11 may be screw 22 on shaft 23. The extremity of shaft 23 may terminate immediately adjacent to perforated plate 24 through which material 16 may be extruded from the apparatus. The extrusion portion of the device, i.e. that portion thereof containing screw 22 and shaft 23, may be fitted with cooling water jacket 25 to which cooling water may be admitted through conduit 26 and from which it may leave through conduit 27. The material which may be admitted through the hopper 16 into the chamber may be cooked as it passes through the chamber while being mechanically worked because of the interrelated action of the threads 12 on the screw 11 and the teeth 14 on the inner side of shell 13. This material passes from the working portion of the machine (including screw 11) to the extrusion portion thereof (including screw 22), then through terminal or outlet 17 and subsequently it is extruded through the perforations in plate 24.

The invention will now be more fully understood from the following examples:

*Example No. 1.—Cornflakes*

*Formula.*—90% corn flour, 8% sugar, 1% salt, 1% malt flavoring.

*Processing.*—Sufficient water is added to the ingredients to form a mixture containing approximately 25% moisture. The wetted mixture is fed into the kneading extruder described hereinabove, the screw and jacket of which are steam heated to 350° F. Residence time within the kneading extruder is about three minutes. Of the accountable heat transferred to the material during this operation, about 60% may be traced to mechanical input, and the remaining 40% to heat derived from steam jacket. Cooked material from this first zone is passed into a second zone in which both the screw and outer jacket are water cooled. Temperature and flow of the cooling medium is regulated so as to maintain the temperature of the cooked material leaving this zone at about 180° F. Cooked material is extruded from this cooling zone through a die plate fitted with a rotary knife by means of which the extrudate is cut into pellets approximately 1/8" in diameter and 1/8" long. At this point it is preferable to cool the pellets to a temperature below 100° F. to eliminate stickiness, after which the pellets are at about 20% moisture. Moisture content is evenly distributed through the pellet without case hardening, and they may be flaked immediately if desired or stored for a period of time before flaking if this is more convenient.

The pellets are rolled into flakes of about 0.025" in the conventional manner, and are toasted at 400–500° F. with radiant heat or with forced hot air. The resulting flakes are crisp, low in density, and have a highly blistered surface. Their flavor is somewhat different from that of corn flakes now on the market in that there is more of a natural corn flavor, somewhat like that of corn bread.

*Example No. 2.—Bran Flakes*

*Formula.*—60% ground whole wheat, 24% bran, 15% sugar, 1% salt, plus added thiamine.

*Processing.*—Sufficient water is added to the ingredients to form a mixture containing 24% moisture. This mixture is cooked and cooled as in Example 1 except that cooking jacket and screw temperatures are maintained at 275° F. Under these conditions the material is thoroughly cooked, without undue scorching of the relatively high sugar content, or destruction of the added thiamine.

The pellets are flaked as in Example 1, and toasted at 300–350° F. The resulting product is similar to Bran Flakes now on the market, except that the over-all size of the flakes is usually larger and more uniform.

*Example No. 3.—Wheat Flakes*

*Formula.*—85% ground whole wheat, 7% sugar, 7% malt flavoring, 1% salt.

*Processing.*—Sufficient water is added to the ingredients to form a mixture containing 25% moisture. Processing conditions are as described as in Example 1, except that cooking zone jacket and screw temperatures are held at 300° F.

The pellets are cut to a size approximately 1/8" x 1/16". They are then flaked and toasted as in Example 1. The resulting product is similar to whole wheat flakes now on the market.

*Example No. 4.—Rice Flakes*

*Formula.*—89% rice flour, 10% sugar, 1% salt.

*Processing.*—Sufficient water is added to the ingredients to form a mixture containing 23% moisture. The material is cooked and subsequently cooled as in Example 1, whereafter it is extruded through a 3/32" diameter die and cut into pellets approximately within the size range of cooked rice grains. These rice pellets may then be subjected to toasting at temperatures of 400–500° F., in which case an oval shaped oven puffed rice product results. Or, they may be flaked before toasting, which treatment would then result in a crisp blistered rice flake product.

*Example No. 5.—High Protein Flake*

*Formula.*—25% wheat flour, 25% rice flour, 25% corn flour, 15% oat flour, 5% casein, 5% soy flour, 5% brewers yeast, 4% wheat germ, 5% sugar, 1% salt.

*Processing.*—Sufficient water is added to the ingredients to form a mixture containing 28% moisture. In cooking, kneading extrusion temperatures are maintained at 250° F. Under these processing conditions, no significant loss of nutritional value inherent in the raw materials occur. The cooked and cooled material is extruded through 1/8" die openings. The pellets are then flaked and subsequently toasted at temperatures of 275–300° F. The resulting cereal is crisp, palatable, and retains a high proportion of the original nutritional value.

Although the invention has been described with reference to specific examples employing specific farinaceous cereal mixtures and operating conditions as well as preferred extrusion cookers, it is not to be restricted to such details. The process is particularly adaptable to the production of a high protein breakfast cereal flake which employs blends of the more serviceable and conventional cereal flours with meals and flours extremely high in protein such as soy bean meal, soy flour, cottonseed meal, fish meal, yeast, non-fat milk solids, wheat gluten and the like. Similarly, due to the extremely short processing time in the cooking and tempering zones in comparison to the more conventional methods there is much less tendency for the destruction of amino acids, and vitamins, such that the nutritive value of the cereal made by this method is great and, indeed, additional nutrients can be incorporated in the moist farinaceous cereal mixture instead of in later processing. In addition, the volatile flavoring materials comminuted fruits, like raisins, peaches, apples, and purees, can be incorporated into the moist farinaceous cereal mixture and be processed in a thoroughly compatible manner.

What is claimed is:

1. A process for making a ready-to-eat breakfast cereal product which comprises compounding a moist comminuted starch-containing cereal mixture having a moisture content of about 15%–30%, passing said mixture between relatively moving proximately spaced surfaces which generate a high pressure and temperature and rupture starch granules in said mixture to produce a cooked dough having a temperature of at least 212° F. wherein the moisture present tends to vaporize and expand the material thereof, tempering said cooked dough by confining and cooling it until it assumes a condition whereat the dough will not substantially expand when it is unconfined at normal atmospheric pressure, flaking said tempered dough, and toasting the flaked dough to produce a blistered and crisp ready-to-eat breakfast cereal flake.

2. A process for making a ready-to-eat breakfast cereal product which comprises compounding a moist uncooked comminuted starch-containing cereal mixture having a moisture content of about 15%–30%, kneading and advancing said mixture between relatively moving, proximately spaced surfaces which generate a progressive build-up of pressure and temperature and rupture of starch granules in said mixture to produce a cooked dough having a temperature of at least 212° F. wherein the moisture present tends to vaporize and expand the material thereof, the spacing and relation of said surfaces being such that a majority of the heat energy employed to cook said mixture is traceable to the work employed to knead and advance said mixture; tempering said cooked dough by confining and cooling it until it assumes a condition whereat the dough will not substantially expand when it is unconfined at normal atmospheric pressure; flaking said tempered dough; and toasting the flaked dough to produce a blistered and crisp ready-to-eat breakfast cereal flake.

3. A process for making a ready-to-eat breakfast cereal product which comprises compounding a moist mixture of starchy uncooked cereal material having a moisture level of about 15%–30%; kneading and advancing said mixture between relatively moving, proximately spaced surfaces at least some of which are heated to generate a progressive build-up of pressure and temperature and rupture of starch granules in said mixture to produce a cooked dough having a temperature of at least 212° F. wherein the moisture present tends to vaporize and expand the material thereof, the spacing and relation of said surfaces being such that a majority of the heat energy employed to cook said mixture is traceable to the work employed to knead and advance said mixture; advancing said cooked dough between cooling relatively moving surfaces wherebetween the dough is confined and cooled to a temperature below that at which the dough will not expand to a spongy, cellular condition and will have a density greater than that of water at normal atmospheric pressure; forming the dough into pieces suitable for flaking; flaking said pieces; and toasting said flaked pieces to produce a blistered and crisp ready-to-eat breakfast cereal flake.

4. A process for making a ready-to-eat breakfast cereal product which comprises compounding a mixture of starchy uncooked cereal material having a moisture level of about 20–25%; kneading and advancing said mixture between relatively moving, proximately spaced surfaces at least some of which are heated to generate a progressive build-up of pressure and temperature and rupture of starch granules in said mixture to produce a cooked dough having a temperature of at least 250° F. wherein the moisture present tends to vaporize and expand the material thereof, the spacing and relation of said surfaces being such that a majority of the heat energy employed to cook said mixture is traceable to the work employed to knead and advance said mixture; advancing said cooked dough in an unexpanded condition between cooling, relatively moving surfaces wherebetween the dough is confined and rapidly cooled to a temperature below 212° F.; extruding the cooled dough under normal atmospheric pressure into pieces suitable for flaking; flaking said pieces to form flaked pieces; and toasting said flaked pieces to produce a blistered and crisp ready-to-eat breakfast cereal flake.

5. A process according to claim 4 wherein the cooked dough has a moisture content of the order of 18–24% by weight and is cooled to a temperature of 160°–200° F. prior to extrusion.

6. A process according to claim 5 wherein the flake has a thickness of 0.010–0.050 inch before toasting.

References Cited in the file of this patent

UNITED STATES PATENTS

| | | |
|---|---|---|
| 1,189,129 | Kellogg | June 27, 1916 |
| 1,758,272 | Anderson | May 13, 1930 |
| 2,060,408 | Wood | Nov. 10, 1936 |
| 2,295,868 | Schwebke et al. | Sept. 15, 1942 |